INVENTOR.
ARTHUR ORENBERG

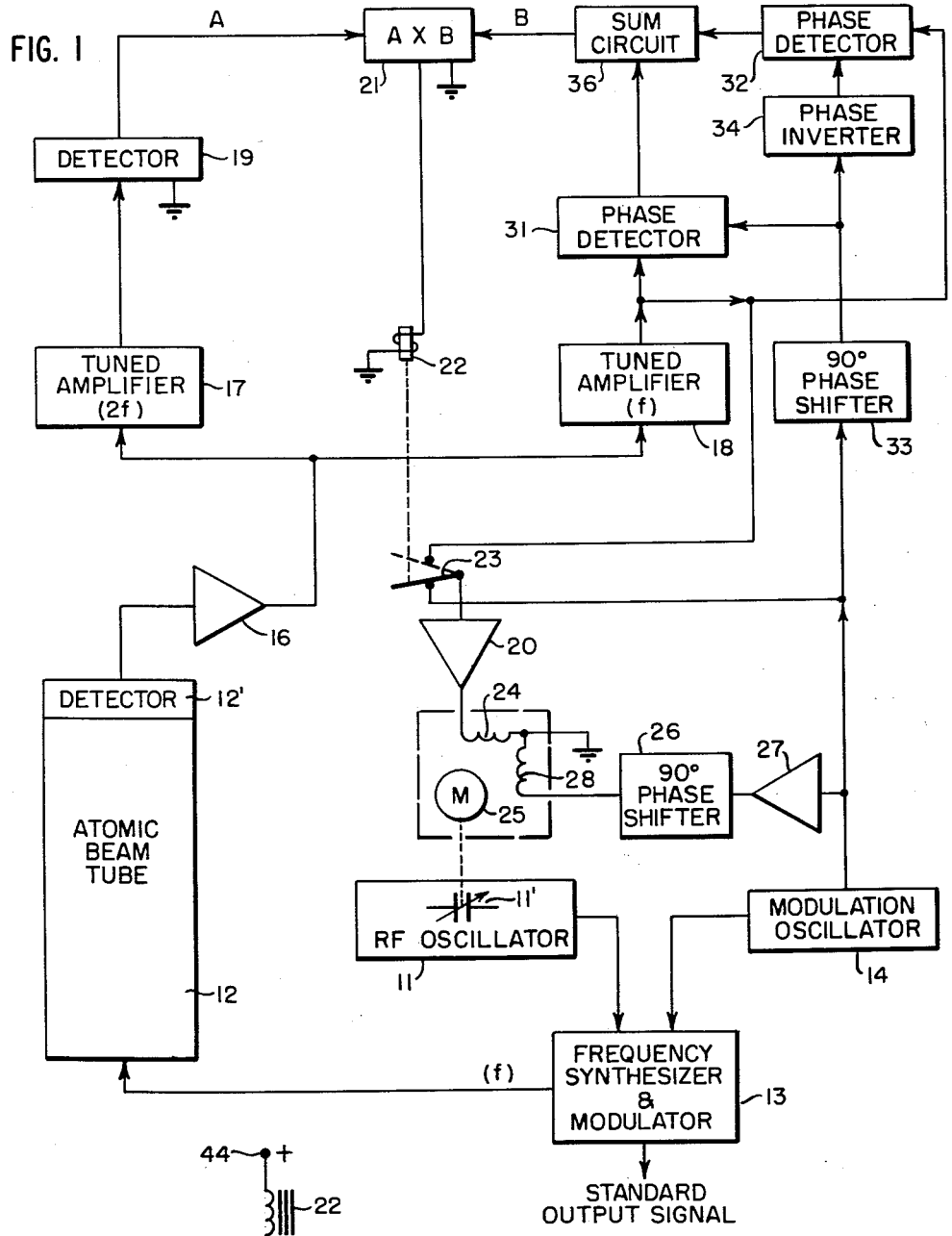

United States Patent Office 3,021,491
Patented Feb. 13, 1962

3,021,491
FREQUENCY CONTROL APPARATUS FOR AN ATOMIC BEAM TUBE

Arthur Orenberg, Lexington, Mass., assignor to National Company, Inc., Melrose, Mass., a corporation of Massachusetts
Filed July 26, 1960, Ser. No. 45,447
6 Claims. (Cl. 331—3)

This invention relates to automatic frequency controls for frequency standards and more particularly it is concerned with the automatic tuning of an electronic flywheel oscillator to the resonance frequency of an atomic beam tube or the like.

Because of their extremely high stability and demonstrated practical worth, frequency standards which depend upon atomic resonance phenomena have come into relatively wide use considering the current nature of their development as a commercial item. Conventional apparatus of this kind features an atomic beam tube and an associated detector which provides an output voltage or variable magnitude depending upon the frequency of an applied RF signal. At the true resonance frequency of the beam tube, an output voltage maximum occurs so that frequency or phase modulation of the applied RF signal introduces an A.C. voltage component at the modulating frequency into the detector output which increases as the displacement between the applied signal center frequency and the fixed beam tube resonance frequency increases. Also, this fundamental component undergoes a phase reversal whenever the applied signal center frequency passes through the resonance frequency. When the two frequencies coincide, however, then the fundamental component disappears.

To control the RF signal center frequency, the fundamental A.C. component is used to operate a servo motor having the modulation signal itself applied thereto as a reference. The servo motor in turn is adapted to mechanically tune an oscillator upon which the applied RF signal is frequency dependent. In operation, the oscillator is driven by the servo motor to the proper frequency to obtain an applied signal frequency equal to the resonance frequency of the beam tube whereupon a null balance is effected.

When such conventional apparatus is placed in operation initially, it is often difficult to establish the correct oscillator frequency because of the fact that the detector output voltage characteristic, that is the direct output voltage from the detector as a function of the applied signal frequency, exhibits a number of maxima and a null balance can occur at other than the central maximum which corresponds to the true resonance frequency. In the past, various schemes have been used to overcome this difficulty. It is known, for example, that a second harmonic component is also produced in the detector output which has a maximum amplitude at the true resonance frequency. Accordingly, a common practice has been to tune the oscillator manually with regard to a meter which is adapted to indicate substantially only the magnitude of the second harmonic component. A disadvantage of this scheme is that the second harmonic also exhibits a number of maxima at frequencies other than the resonance frequency and at those maxima which are nearest in frequency to the resonance frequency, the value of the second harmonic is only slightly less than the maximum value obtained at resonance. A further complication arises from the fact that the detector output level can vary considerably with age and operating environment so that by itself, the absolute value of the second harmonic component does not provide a reliable indication of resonance frequency.

Quite a different scheme is disclosed in the copending application of Walter A. Mainberger S.N. 744,729, filed June 26, 1958 and entitled "Frequency Control Apparatus." The basis for determining resonance frequency according to this scheme is the phase relation between the modulating signal and the fundamental detector output signal having the same frequency as the modulating signal. That is to say, only at the true resonance frequency do both the in-phase and quadrature components of the fundamental vanish, whereas individually these components exhibit a number of non-coincident zero crossings. A switching arrangement whereby the comparative effects that the in-phase and quadrature components have on certain operational aspects of the apparatus is used to take advantage of this fact. However, a drawback of this scheme is that a rather detailed manual adjustment procedure is required to establish the in-phase and quadrature components and to compare their effects before an automatic mode of operation can be finally instituted.

The object of the present invention therefore is to provide apparatus for placing an atomic frequency standard in operation at the true resonance frequency of the beam tube by automatic means.

Another object is to provide highly reliable apparatus of the above-mentioned character.

A still further object is to provide apparatus of the above-mentioned character which does not add appreciably to the complexity of the system.

The novel features of the invention together with further objects and advantages thereof will become apparent from the following detailed description of a preferred embodiment and the drawing to which it refers.

In the drawing:

FIG. 1 is a block diagram of the apparatus according to the invention; and

FIG. 2 is a schematic diagram of an electron tube circuit to implement the logical device shown in block form in FIG. 1;

Figure 3:
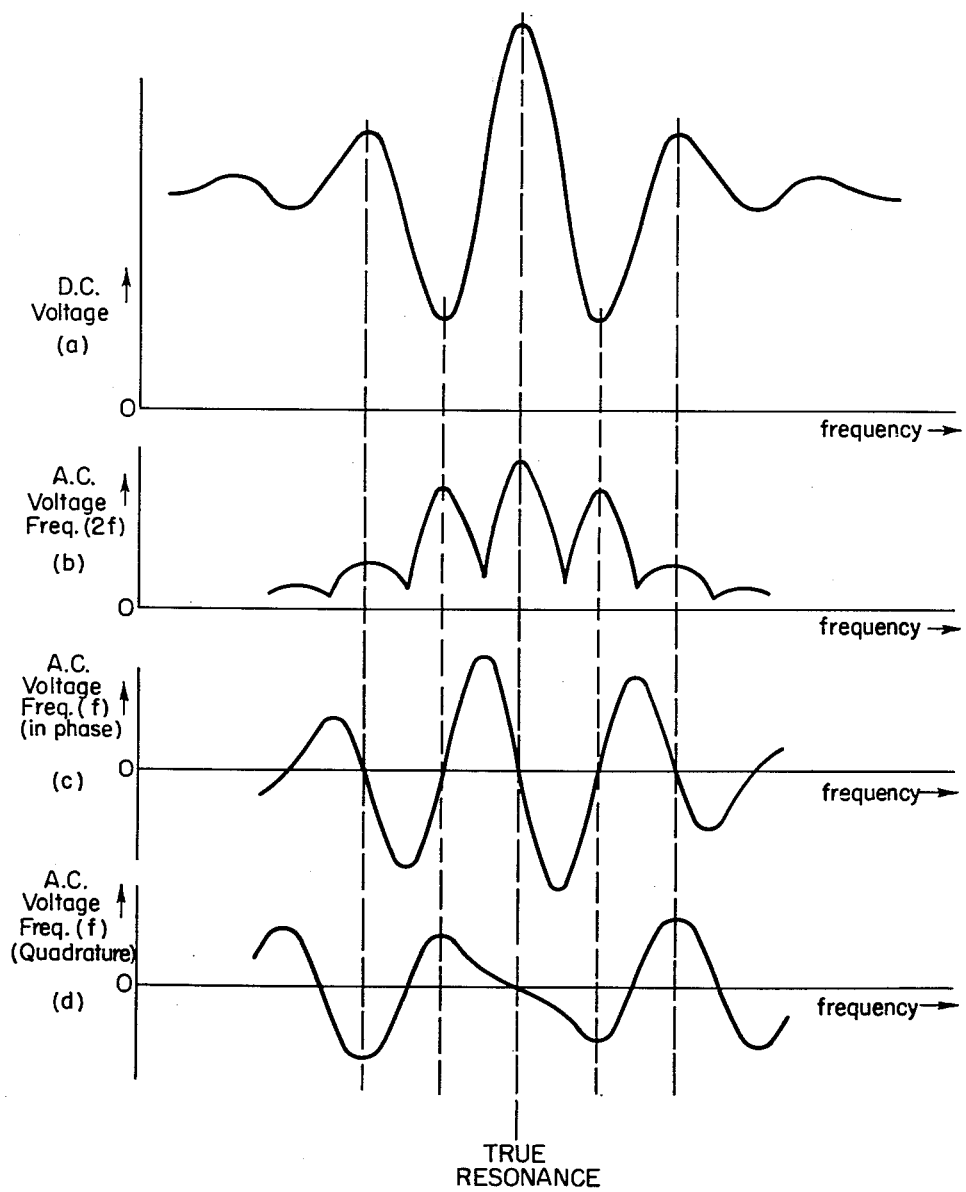
FIG. 3a is a graph illustrating the direct voltage output of the beam tube detector associated with the apparatus as a funtcion of applied RF signal frequency when the applied signal is unmodulated.
FIG. 3b is a graph illustrating the alternating voltage output of the detector having a frequency (2f) as a function of the applied RF signal frequency when the applied signal is angle modulated at a frequency (f)
FIG. 3c is a graph illustrating the component of the alternating voltage output from the detector having the same frequency and phase as the modulating signal.
FIG. 3d is a graph illustrating the component of the alternating voltage output from the detector having the same frequency but in phase quadrature with the modulating signal.

With reference first to FIG. 1, it will be observed that the numeral 11 designates an oscillator to be controlled in frequency by a standard and the numeral 12 designates an atomic beam tube standard. As the resonance frequency of such a beam tube is relatively high, that is much higher than is obtainable from the preferred type of oscillator 11, namely, a crystal oscillator, the oscillator output signal is applied to a frequency synthesizer 13 which performs various frequency multiplying and mixing operations. In this way, two output signals bearing a fixed frequency relation to the oscillator signal are produced. One of these output signals has a useful output frequency for standard reference purposes such as 1 megacycle per second. The other output signal has the capability of being matched in frequency to the atomic resonance frequency of the beam tube to which it is applied. Also, angle modulation, that is, either phase or frequency modulation, is applied to the latter signal in the synthesizer, the modulation signal being supplied by a modulation oscillator 14. The frequency synthesizer 13 can be entirely conventional although a preferred form of such a device is disclosed in detail in Patent No. 2,883,540 issued to Eugene F. Grant, April 21, 1959.

Coupled to the detector 12 associated with the beam tube is an amplifier 16 which in turn is coupled to a pair of tuned amplifiers 17 and 18. As indicated, amplifier 17 is selectively responsive to the second harmonic signal which is present in the detector output while amplifier 18 is tuned to the fundamental frequency of the detector output corresponding to the modulation frequency. The second harmonic signal is converted to a direct voltage in a detector 19 and the direct voltage is applied to one of the inputs of a circuit 21 to perform the logical function $A \times B$, where A, the direct voltage, is one of the input signals thereto and B is the other. A relay coil 22 for actuating a switching device 23 is coupled to the output of the logical circuit. The switching device serves to connect the amplifier 20 which drives the control winding 24 of a servo motor 25 to the output of either the tuned amplifier 18 or the modulation oscillator 14. A phase shifter 26 serves to provide a 90 degree phase shift of the modulation signal from oscillator 14 which is supplied by way of an amplifier 27 to the reference winding 28 of the servo motor. The motor in turn is mechanically coupled to an element 11' such as a variable capacitor to control the frequency of the RF oscillator 11. As is conventional, the motor is responsive only to signals in the windings 24, 28 having quadrature phase related components and the direction of rotation of the motor is determined by the sense of the quadrature phase displacement of such components.

The other input to logical circuit 21, the B input signal, is derived as follows. Coupled to the amplifier 18 of the fundamental frequency signal are a pair of phase detectors 31 and 32, the first of which is supplied with a reference signal from modulation oscillator 14 by way of a phase shifter 33. The reference signal for the second phase detector 32 is obtained in similar fashion except that it undergoes a further phase shift of 180 degrees in a phase inverter 34. The D.C. outputs of the two phase detectors driving the sum circuit are thus always equal but opposite in polarity. The sum circuit 36 then accepts these two D.C. inputs, eliminates the positive one and transmits the negative one to circuit 21. Thus the B input to 21 is always a negative voltage except when the phase detector outputs 31 and 32 are both zero, which in turn means that the quadrature output of the beam tube is zero.

FIG. 2 illustrates a relatively simple way that the logical function which circuit 21 performs can be implemented. Thus, as shown in FIG. 2, the A signal input, that is the input signal from detector 19 is applied to the suppressor grid 41 of a tetrode or pentode electron tube having a control grid 42 to which the B signal from sum circuit 36 is applied. The anode 43 of the tube is connected to a source of direct voltage 44 through the relay coil 22 and the cathode 45 is connected to the negative terminal or ground. When sufficient voltage is impressed on the suppressor 41 by the A signal, enough current is caused to flow in the anode circuit to energize the relay, provided that little or no negative D.C. signal is present on the control grid. Conversely, when even a relatively small negative bias on control grid 42 is produced by the B signal from sum circuit 36, the anode current in the tube is sufficiently limited to prevent the relay from being energized.

The over-all operation of the apparatus is as follows. With the RF oscillator at some initial frequency other than that adapted to produce operation of the beam tube at its true resonant frequency, switch 23 assumes the full line position shown in FIG. 1 so that quadrature phase signals are applied to windings 24 and 28. In consequence, the motor is caused to rotate, and as the motor rotates, the operating frequency range of the oscillator is swept and the output of the beam tube caused to fluctuate in the manner indicated in FIG. 3a. FIG. 3b illustrates the frequency dependence of the amplitude of the second harmonic signal which is present in the detector output; FIG. 3c illustrates the frequency dependence of the in-phase component of the fundamental frequency signal, and FIG. 3d illustrates the quadrature component of the fundamental signal as a function of frequency. At the resonance frequency of the beam tube, it will be observed that the second harmonic signal is a maximum, whereas both the in-phase and quadrature components of the fundamental are zero. However, it will also be observed that the second harmonic signal exhibits other maxima where the amplitude of the signal has a relatively large value. At these other maxima, the in-phase component of the fundamental frequency signal is zero as it is at resonance. The opposite is true of the quadrature component, however, so that the presence of a large second harmonic signal and the absence of a quadrature component signal of fundamental frequency uniquely characterize the resonance frequency of the beam tube.

Accordingly, as the frequency of the RF oscillator approaches the value which is adapted to produce operation of the beam tube at its true resonance frequency, the A signal or positive voltage applied to logical circuit 21 will approach a maximum. At the same time, the phase detector output signals will gradually vanish as the reference signals applied thereto are in phase quadrature with the modulation signal as is, of course, the quadrature component of the detector output which falls to zero at the true resonance frequency of the beam tube. The net result, therefore, is that both conditions for response of the logical circuit 21 are fulfilled whereby the relay 22 is energized and the switch 23 caused to assume the dotted line position shown in FIG. 1. The normal mode of operation of the apparatus then ensues.

That is to say, the winding 24 is now coupled to the detector 12' by way of the amplifiers 16, 18, and 20 so that any departure from the beam tube resonance frequency results in a signal being applied to winding 24 which is in phase quadrature with the signal applied to winding 28. In this way, the oscillator 11 is driven by the servo motor to the frequency with which, through the medium of the synthesizer 13, the true resonance frequency of the beam tube is realized.

In the preferred embodiment of FIG. 1, a pair of phase detectors are employed to insure that a B signal in the form of a negative voltage is applied to circuit 21 irrespective of the sense of the phase displacement between the signal of fundamental frequency provided by amplifier 16 and the phase shifted modulation signal supplied by phase shifter 33, if, indeed, there is a quadrature component of the fundamental signal present. To this end, the sum circuit 36 can take the form of a pair of reversed diode rectifiers connected in parallel to the individual phase detector outputs. However, a single phase detector together with a D.C. phase inverter could be used to produce the same result. In accordance with this arrangement, one of the diodes would be connected directly to the phase detector output while the other diode would be connected thereto by way of the inverter. Also, it will be appreciated that the apparatus is applicable to other than atomic beam tube frequency standards as the underlying principles thereof are dependent only upon the types of standard output signal that is produced and not upon the mechanism of producing it.

Accordingly, the invention should not be deemed to be limited to the details of the preferred embodiment which has been described herein by way of example as the same is susceptible of various modifications within the spirit and scope of the invention. Rather the invention should

What is claimed is:

1. Frequency control apparatus for an atomic beam tube having a detector or the like, said apparatus comprising means for producing a standard radio frequency signal and applying it to said beam tube, means to produce a modulating signal for angle modulation of said radio frequency signal at a substantially fixed frequency, means coupled to the detector of said beam tube for selectively transmitting a second harmonic output signal from the detector having twice the frequency of said fixed frequency modulating signal, means to produce a first error signal which is selectively responsive to the magnitude of said second harmonic output signal, means coupled to the detector for selectively transmitting a fundamental output signal having the same frequency as said modulating signal, means to produce a second error signal which is selectively responsive to the component of the fundamental output signal which is in phase quadrature with respect to the modulating signal, means to vary the standard frequency throughout the operating frequency range of said beam tube, and means to disable said means to vary the standard frequency upon the occurrence of a first error signal of predetermined threshold value and the non-occurrence of said second error signal.

2. Frequency control apparatus for an atomic beam tube having a detector or the like, said apparatus comprising means for producing a standard radio frequency signal and applying it to said beam tube, means to produce a modulating signal for angle modulation of said radio frequency signal at a substantially fixed frequency, means coupled to the detector of said beam tube for selectively transmitting a second harmonic output signal from the detector having twice the frequency of said fixed frequency modulating signal, means to produce a first error signal which is selectively responsive to the magnitude of said second harmonic output signal, means coupled to the detector for selectively transmitting a fundamental output signal having the same frequency as said modulating signal, means to produce a second error signal which is selectively responsive to the component of the fundamental output signal which is in phase quadrature with respect to the modulating signal, means to sweep the standard frequency throughout the operating frequency range of said beam tube, means to disable said sweep means upon the occurrence of a first error signal of predetermined threshold value and the non-occurrence of said second error signal, and means to control the frequency of said standard signal as a function substantially only of said fundamental output signal when said frequency sweep means is disabled.

3. Frequency control apparatus for an atomic beam tube having a detector or the like, said apparatus comprising means for producing a standard radio frequency signal and applying it to said beam tube, mechanically actuable means to change the standard frequency, means to produce a modulating signal for angle modulation of said radio frequency signal at a substantially fixed frequency, means coupled to the detector of said beam tube for selectively transmitting a second harmonic output signal from the detector having twice the frequency of said fixed frequency modulating signal, means to produce a first error signal which is selectively responsive to the magnitude of said second harmonic output signal, means coupled to the detector for selectively transmitting a fundamental output signal having the same frequency as said modulating signal, means to produce a second error signal which is selectively responsive to the component of the fundamental output signal which is in phase quadrature with respect to the modulating signal, a servo motor coupled to said frequency change means, said motor having a reference winding and a control winding, means to sweep the standard frequency throughout the operating frequency range of said beam tube, means to energize said reference winding continuously in response to said modulation signal, and signal controlled switch means to disable said sweep means and to energize said control winding in response to a signal of fundamental frequency derived from said detector upon the occurrence of a first error signal of predetermined threshold value and the non-occurrence of said second error signal.

4. Frequency control apparatus for an atomic beam tube or the like having an associated detector, said apparatus comprising means for producing a standard radio frequency signal and applying it to said beam tube, means to produce a modulating signal for angle modulation of said radio frequency signal at a substantially fixed frequency, a tuned amplifier and detector coupled to the beam tube detector to produce a first D.C. error signal which is a function substantially only of the magnitude of the second harmonic output signal from the beam tube detector having twice the frequency of said fixed frequency modulating signal, means to shift the phase of the modulation signal, a second tuned amplifier coupled to the beam tube detector to amplify the fundamental output signal having the same frequency as said modulation signal, at least one phase detector having a pair of input circuits to which said fundamental and phase shifted modulation signals are applied, means to derive from said phase detector a second D.C. error signal which is substantially only a function of the component of the fundamental signal which is in phase with the phase shifted modulation signal, means to vary the standard frequency throughout the operating frequency range of said beam tube, means to disable said means to vary the standard frequency upon the occurrence of a first error signal of predetermined threshold value and the non-occurrence of said second error signal, and means to control the frequency of said standard signal as a function substantially only of the fundamental output signal which is in phase with said fixed frequency modulated signal when said frequency sweep means is disabled.

5. Frequency control apparatus for an atomic beam tube having a detector or the like, said apparatus comprising means for producing a standard radio frequency signal and applying it to said beam tube, mechanically actuable means to change the standard frequency, means to produce a modulating signal for angle modulation of said radio frequency signal at a substantially fixed frequency, a tuned amplifier and detector coupled to the beam tube detector to produce a first D.C. error signal which is a function substantially only of the magnitiude of said second harmonic output signal from the beam tube detector having twice the frequency of said fixed frequency modulation signal, means to shift the phase of the modulation signal, a second tuned amplifier coupled to the beam tube detector to amplify the fundamental output signal having the same frequency as said modulation signal, at least one phase detector having a pair of input circuits to which said fundamental and phase shifted modulation signals are applied, means to derive from said phase detector a second D.C. error signal which is substantially only a function of the component of the fundamental signal which is in phase with the phase shifted modulation signal, a servo motor coupled to said frequency change means, said motor having a reference winding and a control winding, means to sweep the standard frequency throughout the operating frequency range of said beam tube, means to energize said reference winding continuously in response to said moduation signal, and signal controlled switch means to disable said sweep means and to energize said control winding in response to a signal of fundamental frequency derived from said detector only upon the occurrence of a first error signal of predetermined threshold value and the non-occurrence of said second error signal.

6. Frequency control apparatus for an atomic beam tube having a detector or the like, said apparatus comprising means for producing a standard radio frequency signal and applying it to said beam tube, mechanically actuable means to change the standard frequency, a modulation oscillator to produce a modulating signal for angle modulation of said radio frequency signal at a substantially fixed frequency, a tuned amplifier and detector coupled to the beam tube detector to produce a first D.C. error signal which is a function substantially only of the magnitude of said second harmonic output signal from the beam tube detector having twice the frequency of said fixed frequency modulation signal, means to shift the phase of the modulation signal, a second tuned amplifier coupled to the beam tube detector to amplify the fundamental output signal having the same frequency as said modulation signal, at least one phase detector having a pair of input circuits to which said fundamental and phase shifted modulation signals are applied, means to derive from said phase detector a second D.C. error signal which is substantially only a function of the component of the fundamental signal which is in phase with the phase shifted modulation signal, a servo motor coupled to said frequency change means, said motor having a reference winding and a control winding, means to energize said reference and control windings with signals derived from said modulation oscillator to produce a standard frequency excursion throughout the operating frequency range of said beam tube, and signal controlled switch means to energize said control winding in response to a signal of fundamental frequency derived from said detector instead of from said modulation oscillator upon the occurrence of a first error signal of predetermined threshold value and the non-occurrence of said second error signal.

No references cited.